US010552236B2

(12) United States Patent
Pahlavan Yali et al.

(10) Patent No.: US 10,552,236 B2
(45) Date of Patent: Feb. 4, 2020

(54) SERIALIZATION OF FOCUS MOVEMENT BETWEEN ELEMENTS IN WEB APPLICATIONS

(71) Applicant: Microsoft Technology Licensing, LLC, Redmond, WA (US)

(72) Inventors: Moein Pahlavan Yali, Bellevue, WA (US); Patrick C Miller, Sammamish, WA (US); John G Nguyen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 15/636,086

(22) Filed: Jun. 28, 2017

(65) Prior Publication Data
US 2019/0004874 A1    Jan. 3, 2019

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |

(52) U.S. Cl.
CPC ........ *G06F 9/542* (2013.01); *G06F 2209/541* (2013.01)

(58) Field of Classification Search
CPC .................................................. G06F 9/542
USPC ....................................................... 719/318
See application file for complete search history.

(56) References Cited

U.S. PATENT DOCUMENTS

| 7,134,089 B2 | 11/2006 | Celik et al. | |
| 8,103,956 B2 | 1/2012 | Trujillo | |
| 2004/0090463 A1* | 5/2004 | Celik | .................... G06F 3/0481 |
| | | | 715/767 |
| 2006/0090138 A1 | 4/2006 | Wang et al. | |
| 2010/0070872 A1* | 3/2010 | Trujillo | ............... G06F 3/04892 |
| | | | 715/745 |

(Continued)

OTHER PUBLICATIONS

"Creating Accessible Web Pages With HTML", https://msdn.microsoft.com/en-us/library/dn806236(v=vs.85).aspx, Retrieved on: Jun. 14, 2017, 5 pages.

(Continued)

*Primary Examiner* — Timothy A Mudrick
(74) *Attorney, Agent, or Firm* — Schwegman Lundberg & Woessner, P.A.

(57) ABSTRACT

Disclosed in some examples, are methods, systems, and machine-readable mediums which provide for a focus management framework that provides for greater knowledge and control of focus transitions. An event listener is attached to a root focusable element of the DOM. The event listener may receive all focus interactions with any child element. By listening for all focus events the framework may provide more powerful events that provide both the source element and destination element as event parameters. This framework allows many different applications, such as for example, allowing the application to customize the order focus is transitioned (from the browser's default order), to allow for a history of focus events, to enable a declarative language for defining behaviors for elements of the application that need to be involved with scenarios that depend on focus transition, aggregating messages sent to assistive technologies triggered by a focus transition, and the like.

20 Claims, 9 Drawing Sheets

(56) References Cited

U.S. PATENT DOCUMENTS

2013/0073949 A1     3/2013   Barrell et al.
2014/0351766 A1   11/2014   Fleming et al.

OTHER PUBLICATIONS

Nielsen, et al., "Keyboard-Only Navigation for Improved Accessibility", https://www.nngroup.com/articles/keyboard-accessibility/, Published on: Apr. 6, 2014, 11 pages.

Mughal, et al., "An overview of accessible web applications and widgets", https://developer.mozilla.org/en-US/docs/Web/Accessibility/An_overview_of_accessible_web_applications_and_widgets, Published on: 2005, 9 pages.

* cited by examiner

SERIALIZATION OF FOCUS MOVEMENT BETWEEN ELEMENTS IN WEB APPLICATIONS

BACKGROUND

Browser-based application descriptors may be sent from a server, over a network, to a client device. A general-purpose application on the client device (e.g., a browser) may parse the browser-based application descriptors to provide one or more webpages. These webpages may have (as described by the browser-based application descriptors) one or more elements. Elements may include pictures, text, input elements, selectable elements, buttons, dials, drop-down boxes, and the like. Browser-based application descriptors may comprise one or more files in one or more formats such as HyperText Markup Language (HTMT), Cascading Style Sheets (CSS), eXtensible Markup Language (XML), JavaScript, Scripting Languages, and the like.

SUMMARY

Embodiments relate to browser-based applications such as webpages, and some embodiments relate to improved focus event handling. For example, determining a focus sub-tree of a document object model (DOM) tree, the DOM tree produced by a browser application in response to loading a browser-based application descriptor, the focus sub-tree comprising a hierarchical ordering of elements from the DOM that are capable of receiving focus; listening for focus related events of a root element of the focus sub-tree; detecting a received focus related input from a user involving an element of the focus sub-tree; and serializing the focus related input from the user to create a serialized output, the serialized output comprising a source element and a destination element, the source element specifying a first element of the DOM that had focus prior to the focus related input, the destination element specifying a second element of the DOM that has focus after the focus related input.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
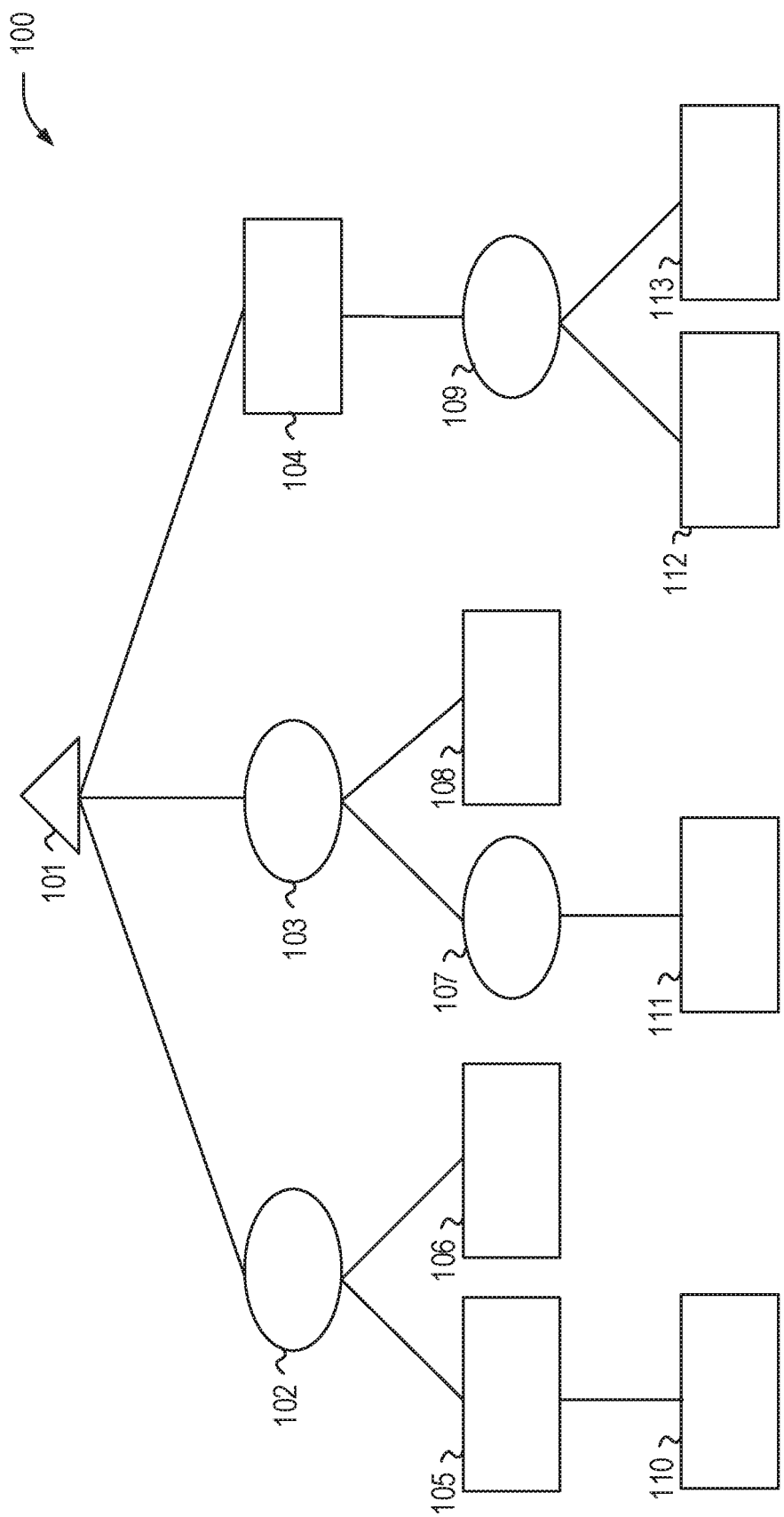
FIG. 1 shows an example element tree produced by a DOM according to sonic examples of the present disclosure.

A web application may be described by browser-based application descriptors and may include multiple elements. The elements may be organized by the browser based upon the browser-based application descriptors into a tree structure called a Document Object Model (DOM)—with a root element and multiple child elements. Child elements may have their own child elements and so on. Some of these elements are focusable, that is, a user may use an input device such as mouse or keyboard to provide input (e.g., mouse over, clicks, TABs into, etc.) to that element. When an element receives focus, subsequent user input is then directed to that element. When an element loses focus, input no longer is directed to that element. At any time, a maximum of one element on the page may have the focus. With each user interaction, the focus may move from one element on the page to another element, or leave the page.

Currently, there is no native cross-platform browser support for management and serialization of focus transitions in web applications. For example, there is no native support for methods for extracting the hierarchy of focusable elements on the page, customizing how focus moves between elements based on keyboard input, obtaining complete directional information for focus events, arbitration in alerting assistive technologies, and a declarative way to define accessibility-related behaviors. These shortcomings make dealing with focus transitions difficult for web applications and prevent focus transitions from being maximized to their fullest potential.

Disclosed in some examples, are methods, systems, and machine-readable mediums which provide for a focus management framework that provides for greater information about and control of focus transitions. In some examples, a JavaScript library or other scripting library implements the focus management framework and is called by a web application that wishes to make use of its services. In some examples, framework components called event listeners that listen for events (e.g., focus in, focus out, and keydown) are attached to a root focusable element of the DOM of the application that wants to use the framework. The event listener may receive all focus interactions with any child element. By listening for all focus events (e.g., focus-in and focus-out), the framework may provide more powerful events to applications that provide both the source element and destination element as event parameters. This framework allows many different applications, such as for example, allowing the application to customize the order that focus is transitioned from element to element based upon key presses (from the browser's default order), to allow for a history of focus events, to enable a declarative language for defining behaviors for elements of the application that need to be involved with scenarios that depend on focus transition, aggregating messages sent to assistive technologies triggered by a focus transition, and the like.

Turning now to FIG. 1, an example element tree produced by a DOM 100 is shown according to some examples of the present disclosure. Root element 101 has child elements 102, 103, and 104. As previously noted, elements may include pictures, input boxes, text boxes, text, frames, iframes, and the like. In FIG. 1, square elements are GUI elements that are capable of receiving focus. Circle elements are GUI elements that are not capable of receiving focus. Example elements that are not capable of receiving focus may be specified by the browser based application descriptors, or may be inherent in their design (e.g., pictures). Child element 102 is not able to receive focus, but has two child elements 105, and 106 that are able to receive focus. Elements able to receive focus may be specified by the browser based application descriptors or may be inherent in the type of element. Example elements able to receive focus may include text boxes, drop down boxes, radio buttons, and other elements that are designed to receive user input. Child element 105 has a child element 110 which may also receive focus. Similarly, child element 103 has child elements 107, 108, and grandchild element 111 (which is a child of element 107). Likewise, child element 104 is able to receive focus and includes non-focusible child element 109, which has its own focusable child elements 112 and 113.

Figure 2:
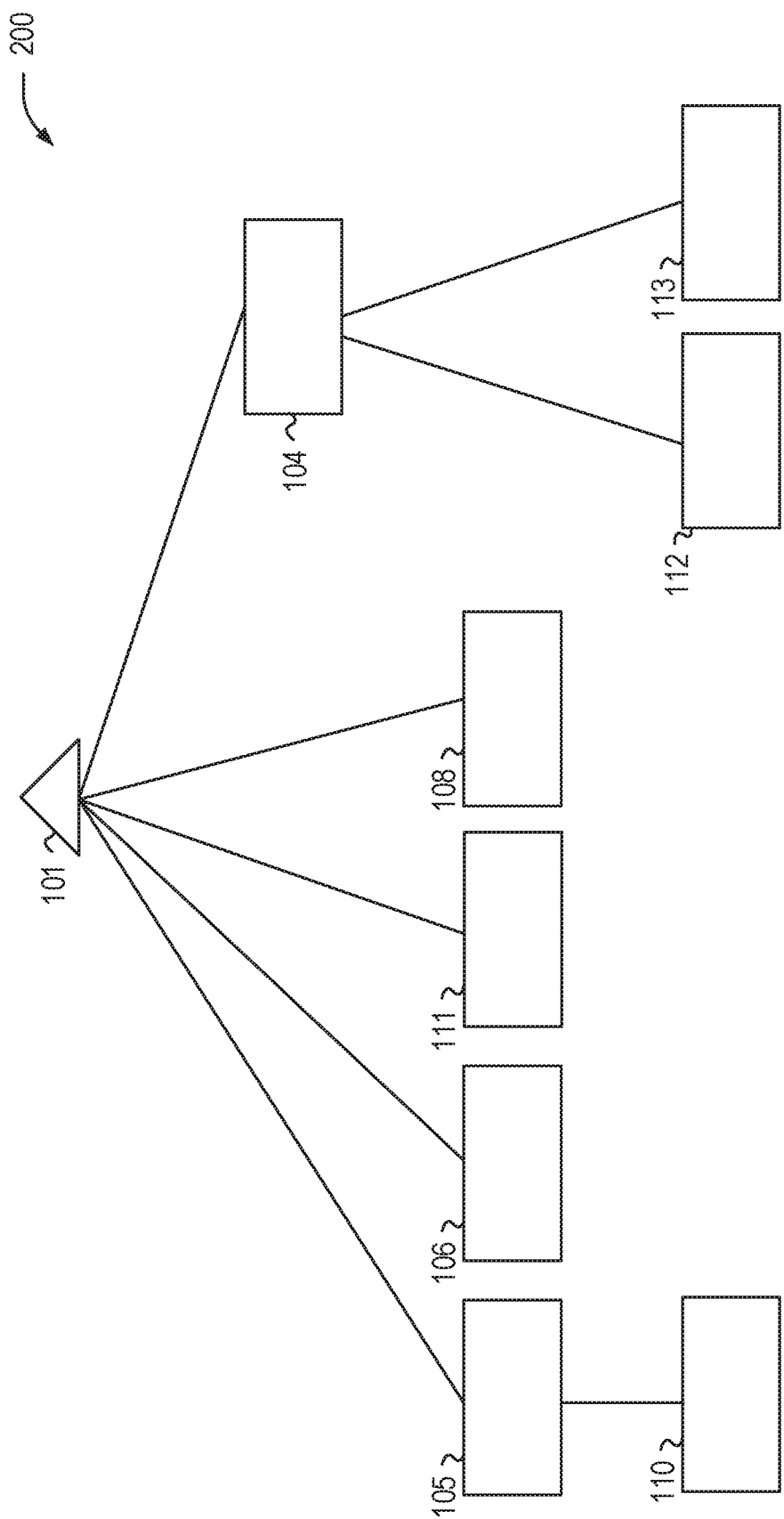
FIG. 2 shows a focus sub-tree created from the DOM according to some examples of the present disclosure.

FIG. 2 shows a focus sub-tree 200 created from the DOM according to some examples of the present disclosure. The focus sub-tree is a focus sub-tree created by the framework from the DOM 100 of FIG. 1. Focus sub-tree consists of DOM elements from FIG. 1 that correspond to focusable elements. Focusable elements from FIG. 1 include child elements 104, 105, 106, 108, 110, 111, 112, and 113. For example, focusable elements may be grouped such that they have child elements. As an example, focusable child element 104 has two child elements, 112, and 113. An event listener may be installed at root element 101. As previously noted, the event listener receives events for all the focusable elements at lower levels in the tree. In the example of FIG. 2, this means that an event listener at root element 101 would receive focus events from elements 104, 105, 106, 108, 110, 111, 112, and 113. Using the event listener at root element 101 it is possible to serialize focus events, customize the order in which keyboard shortcuts TAB and SHIFT-TAB) navigate the focusable elements, and other applications.

Figure 3:
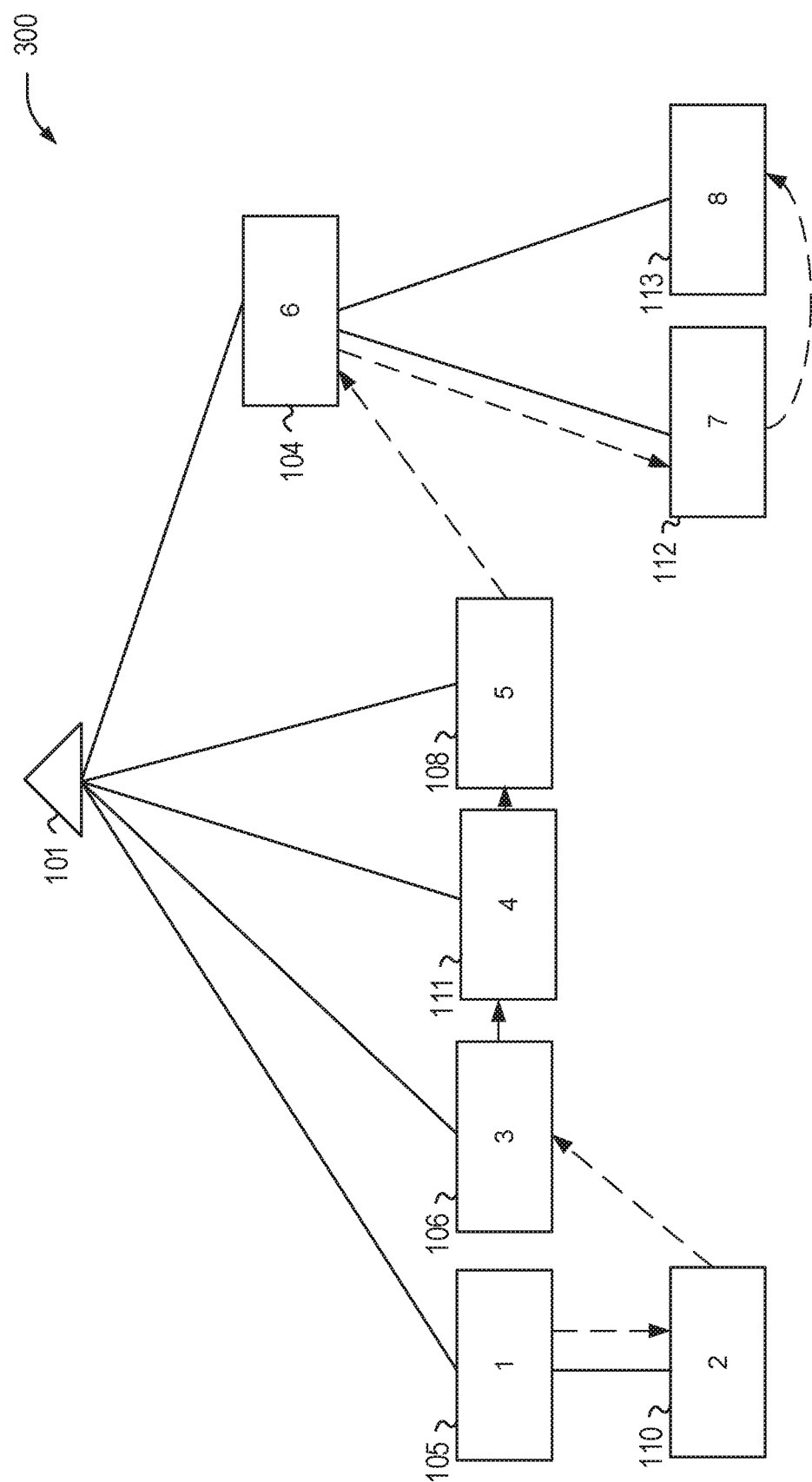
FIG. 3 shows a default focus transition order of a browser upon input of a focus-related input according to some examples of the present disclosure.

For example, FIG. 3 shows a default focus transition order 300 of a browser upon receiving a focus-related input (e.g., TAB) according to some examples of the present disclosure. If focus starts with child element 105, pressing the TAB key shifts focus to element 110, then elements 106, 111, 108, 104, 112, and 113 in that order. A second focus-related input (e.g., a SHIFT-TAB keypress) goes to the previous child element. So, for example, pressing SHIFT-TAB when child element 111 is in focus will cause child element 106 to regain focus. As may be appreciated, this order translates to a depth-first traverse of the focusable sub-tree. This is not ideal in many applications because the sections of the application are created to group elements together and isolate each group from other groups.

The disclosed framework allows for development of a new keyboard navigation order and mechanism that may be used as an alternative to default mechanisms implemented by the browsers. This may be accomplished by having the event listener at the root node listen for and intercept focus related inputs (e.g., key presses) and manually change focus to the next focusable element as desired. For example, a first focus related input (e.g., TAB) may be to change the focus between sibling focusable elements, while two other focus related inputs (e.g., Enter and Escape keys) are used to take the focus up or down a level of the focus sub-tree, respectively. One of ordinary skill in the art with the benefit of this disclosure will appreciate that different keys may be used.

Figure 4:
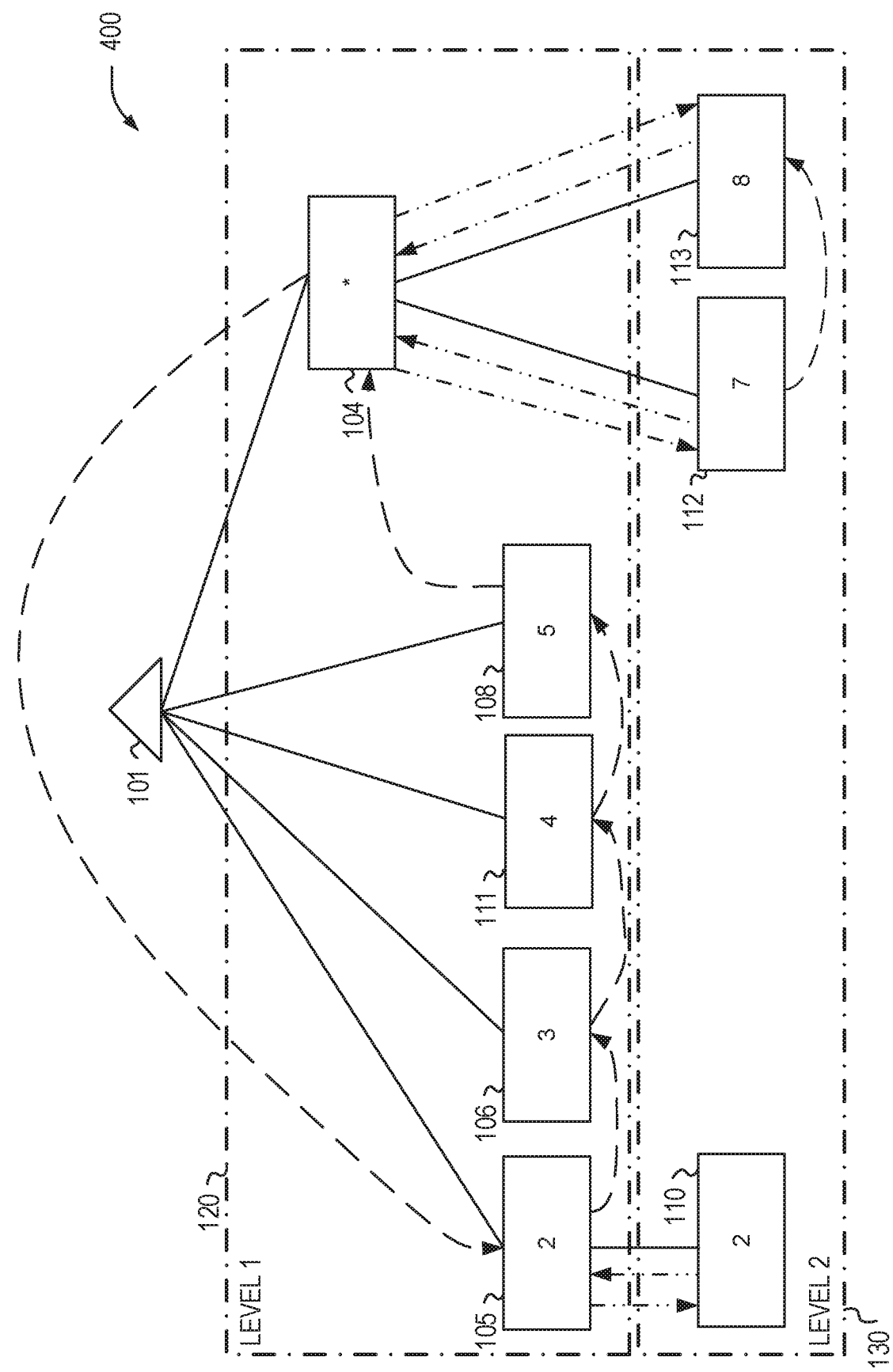
FIG. 4 shows an alternative navigation order according to some examples of the present disclosure.

Turning now to FIG. 4, an alternative navigation order 400 is shown according to some examples of the present disclosure. The example in FICA. 4 translates to a breadth-first traverse of the focusable sub-tree. Assuming element 104 has focus (e.g., by default or by the user first selecting element 104 with a mouse click), a first focus related input (e.g., the TAB key) advances to child element 105, then to 106, 111, 108, and back to child element 104. A second focus related input (e.g., SHIFT-TAB) may go in reverse of the first focus related input. Thus, the first focus related input corresponds to a breadth first search. For example, the first focusable element in a particular path from the root element 101 to a leaf element is a level 1 element. Level 1 elements are elements within square 120. Square 120 is not part of the focus sub-tree, but is a visual indicator of level 1 elements. The first focus related input cycles through all level 1 elements. When element 105 has focus, providing a third focus related input (e.g., pressing another key, such as ENTER) takes the user to the next level in the tree, such as for example, to level 2 elements such as child element 110. Level 2 elements are denoted by square 130. Square 130 is not part of the focus sub-tree, but is a visual indicator of level 1 elements. Once at the lower level, the first and second focus related inputs then cycle through elements at level 2. For example, if element 112 is in focus, providing the first focus related input will cycle through child elements 113 and 112. Providing a fourth focus related input (e.g., an ESCAPE key) will go back up a level.

Thus, under this navigation, a first set of focus related inputs (e.g., TAB and SHIFT-TAB) changes focus back and forth between focusable elements at a particular level of the focus sub-tree, while another set of focus related inputs moves the focus to a different level. This navigation may be termed "hierarchical navigation." With the increasing adoption of HTML 5, the structure of elements in web applications may have a meaningful relation to their representation on the page, which makes this mechanism more relevant than the default one. To implement hierarchical navigation, the event listener attached to the root element detects all relevant focus related inputs (e.g., the first, second, third, and fourth focus related inputs—e.g., Tab, Shift+Tab, Enter, and Escape) and takes the appropriate action, such as moving focus to next focusable element, previous focusable element, next and previous levels, respectively. Relevant focus related inputs may be inputs specified by the browser, the web application, or the framework for changing which element has focus.

One of ordinary skill in the art with the benefit of the present disclosure will appreciate that other navigation patterns may be available and may be customized for a user or developer's needs. For example, either by structuring the webpage through the browser-based application descriptors to a desired order, or by modifying the behavior of the framework through parameters using an Application Programming Interface (API).

As already noted, the framework may also allow for serializing the relationship of elements involved in a focus transition. :For example, when a focus moves from one element to another, a set of events are sent by JavaScript. For example, focus-in events are fired on destination elements and all ancestor elements; and focus-out events are fired on the source element and all its ancestors. For example, by listening to focus-in and focus-out events on the root element of the application, focus movements for all events may be detected and allow for a more powerful event that has both source and destination elements as event parameters. This allows for serializing each focus transition as a pair of elements [source, destination].

For example, the following pseudocode may be utilized by the event listener at the root node:

for each focus-out event record the time of the event (OUT_T) and the target element of the event (OUT_E) and delete any old values in IN_E for each focus-in event record the time of the event (IN_T) and the target element of the event (IN_E)

after each focus-in event and after PARAM_DELAY has passed after a focus-out event, do the following steps:

a. Record a focus transition (OUT_E, IN_E), where either OUT_E or IN_E is valid, b. Delete OUT_E and IN_E PARAM_DELAY is a parameter that may be adjusted depending on the environment. Note that NULL as a source or destination means that the focus is coming from or going to an element outside the application. The ability to serialize focus transitions enables applications to keep a history of focus transitions. This may be useful in logging, debugging, and development. Designers may utilize the focus habits of users to improve website layouts.

In addition, by using the focus transition management technique described earlier, the framework provides the ability to declaratively define behaviors for elements of the application that are involved with scenarios that depend on focus transition. A set of attributes with acceptable values may be utilized by application developers with a well-defined action corresponding to each value. The attributes may relate to focus transitions. For example, "<form alert_upon_focus_out="Please Complete the Form">[content]</form>" may specify that when focus leaves the element to message the user to "Please Complete the Form". Other options may include actions to take when the element gains focus, loses focus, and the like. Actions may be predicated on focus events for a particular element, or a group of elements. Element groups may be defined by reference to elements contained in the group, or may be defined by relationships in the focus sub-tree (e.g., parent/child relationships, level relationships, and the like).

These attributes may be specified in the HTML markup of elements in browser-based application descriptors, JavaScript callback functions, or the like. The framework may monitor all focus transitions on the application and in response to detecting a focus transition, process any declaratively defined behaviors. Example pseudocode is as follows:

For each focus transition (Source, Dest):
  Find the lowest common ancestor (LCA) of Source and Destination from the focus sub-tree
  For each element on a path from the Source to the LCA and for each element from the LCA to the destination (not including the LCA):
    Check if any acceptable attribute with an acceptable value exists that corresponds to the element and to the specified focus transition and take action corresponding to that attribute.

The defined actions described in previous sections may be batched together. One use case of this batching is with accessibility features. For example, the website may alert an assistive technology (such as a screen reader) upon a focus transition. If alerting happens in different parts of the application, different alerts may have timing conflicts which may result in skipping some of the messages by the screen reader or out-of-order messages. For example, if a user changes focus faster than the screen reader may read the messages, the messages may become inconsistent or may conflict. If there are multiple messages that should be alerted because of a single focus transition, the declarative language described earlier may be used to collect the messages for every element on the focus transition path and aggregate all of them into one message and send that message to the assistive technology.

In some examples, two attributes are utilized to collect the messages for each element and aggregate them. A first attribute's value represents a user message for when the focus is going inside the element and a second attribute's value represents a message for when the focus is going outside the element. For every element on the path from the source element to the LCA element the second attribute value (e.g., the message for when focus is going outside the element) is collected. Additionally, for every element from the LCA to the destination element, the first attribute value is collected (e.g., the message for when focus is going into the element). The final message is obtained by concatenating all them together in order. This final message is then displayed or otherwise communicated to the user. For example, with each message on its own line, separated by commas, or sequentially displayed in a series of dialogue boxes (e.g., with each message in its own dialogue). In other examples, the final message may be read by a screen reader. Using this technique, the order of messages is preserved and there will be no timing conflict because there is only one alert sent to the assistive technology.

Figure 5:
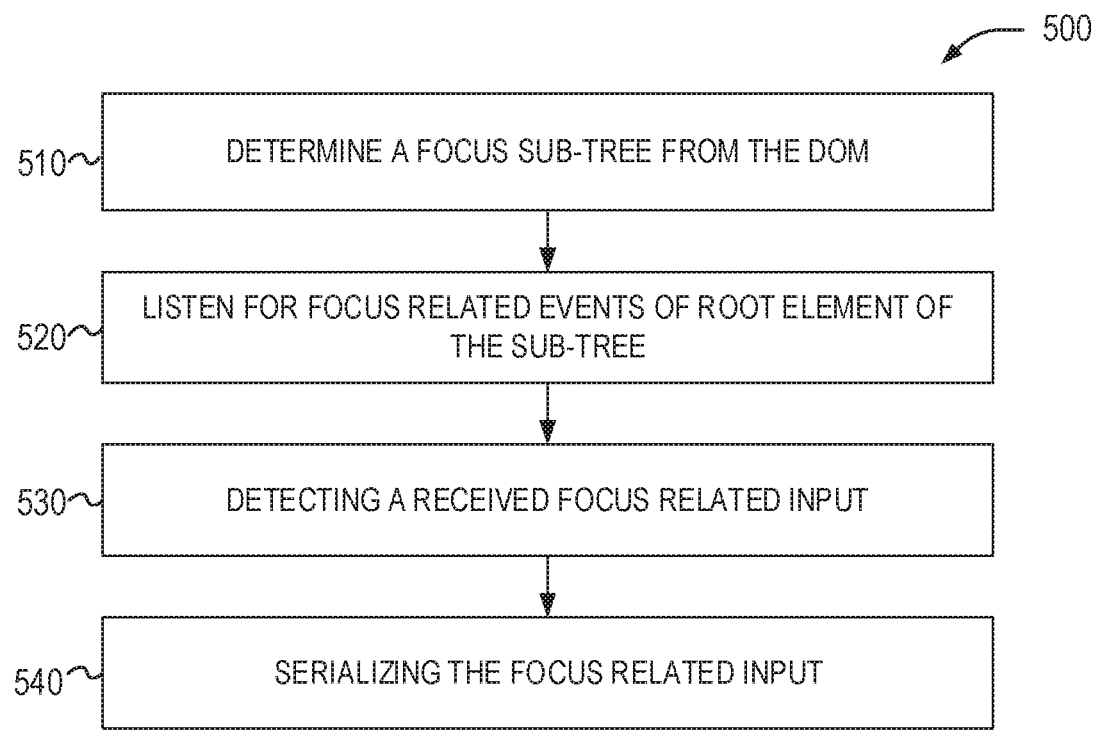
FIG. 5 shows a flowchart of a method of a focus management framework according to some examples of the present disclosure.

FIG. 5 shows a flowchart of a method 500 of a focus management framework according to some examples of the present disclosure. Prior to the operations of FIG. 5 a user may navigate to one or more web addresses. The user's browser may request one or more browser-based application descriptors, which may be provided to the user. Included with the one or more browser-based application descriptors may be the focus management framework, which may be loaded when the user's browser executes the browser-based application descriptors. For example, the focus management framework may be a JavaScript library called by the website. Furthermore, the user's browser may parse the browser-based application descriptors and construct a DOM. At operation 510 the focus management framework may determine a focus sub-tree from the DOM. The focus sub-tree may be determined by searching the DOM breadth or depth first and assigning levels to elements that are capable of receiving focus. Elements that are capable of receiving focus may be specified by the web based application descriptors, or may be defined based upon the type of element (e.g., input elements may be capable of receiving focus by their nature as input elements). The focus sub-tree may be stored in an internal data structure (e.g., either in volatile or non-volatile storage) of the focus management framework, as part of the DOM, or may be determined as needed for a particular operation or usage.

At operation 520, the focus management framework may register for focus related events relating to the root element of the focus sub-tree. For example, the focus management framework may register a callback function with the browser, an operating system, or another layer (e.g., JavaScript engine). At operation 530 a focus related input is detected, for example, by execution of a callback function. At operation 540 the focus related input is serialized. For example, by using the method described in FIG. 6.

Figure 6:
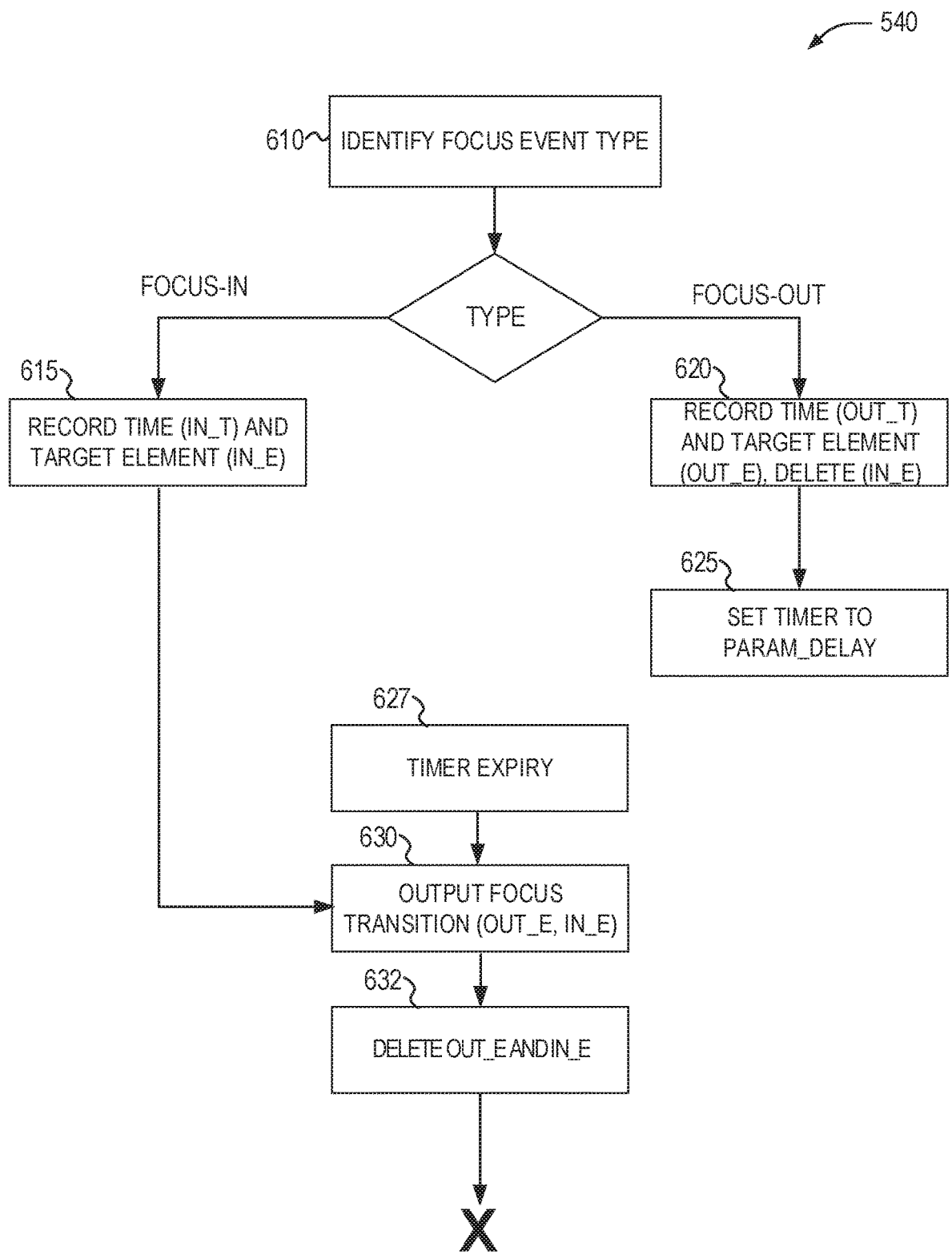
FIG. 6 shows a flowchart of a method of serializing the focus related input according to some examples of the present disclosure.

FIG. 6 shows a flowchart of a method 540 of serializing the focus related input according to some examples of the present disclosure. At operation 610 the framework may identify the focus event type. For example, by inspecting a variable passed in through the callback, or by the particular callback function called (e.g., each event type may have a specific callback function). If the focus event type is a focus—in event (that is, an event that is triggered when an element or an ancestor element gains focus), then at operation 615 the framework may record the time of the event (IN_T) and the target element (IN_E). Flow then proceeds to operation 630-632 where at operation 630 the framework may output a focus transition where the OUT_E element is output as the source and the IN_E is the destination, where one of OUT_E and IN_E are valid. At operation 632, the old values of OUT_E and IN_E are deleted. After operation 630, processing of FIG. 6 ends and may be repeated based upon subsequent focus events.

If the event is a focus-out event (that is, an event that is triggered upon an element losing focus), than at operation 620 the time is recorded (OUT_T), the target element is recorded (OUT_E), and any old value is removed from IN_E. At operation 625, a timer of a predetermined (or configurable) duration (PARAM_DELAY) may be set. Once the timer expires at operation 627, flow proceeds to operation 630. At operation 630 a focus transition is serialized where the OUT_E element is output as the source and the IN_E is the destination, where one of OUT_E and IN_E are valid. At operation 632, the old values of OUT_E and IN_E are deleted. After operation 630, processing of FIG. 6 ends and may be repeated based upon subsequent focus events.

Figure 7:
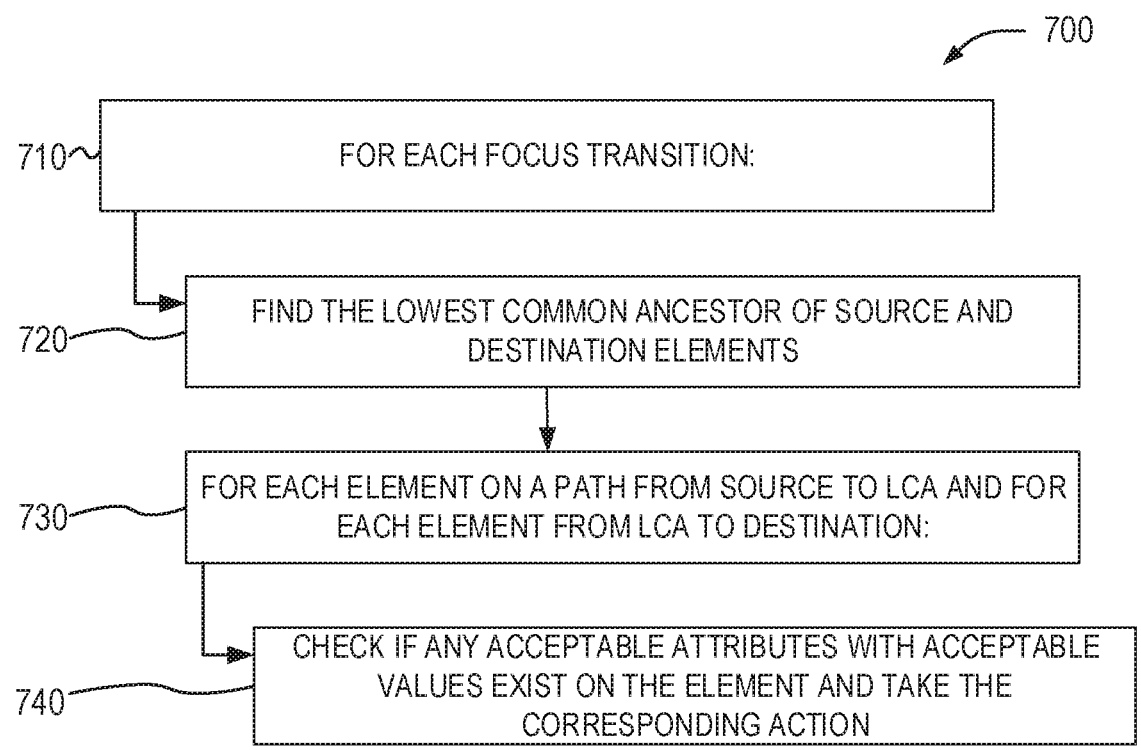
FIG. 7 shows a flowchart of a method of taking custom actions based upon declarative language in the browser-based application descriptors according to some examples of the present disclosure.

FIG. 7 shows a flowchart of a method 700 of taking custom actions based upon declarative language in the browser-based application descriptors according to some examples of the present disclosure. At operation 710, for each particular focus transition, the operations of 720-740 are performed. At operation 720 the framework finds the lowest common ancestor (LCA) of the source and destination elements of the focus transition. At operation 730, for each element on a path from the source to the LCA and on a path from the LCA to the destination, the focus transition may perform operation 740. Operation 740 determines if any acceptable attributes with acceptable values exist on the element—based upon the focus transition—and takes the corresponding action. For example, outputting a string to a screen reader or other accessibility task.

Figure 8:
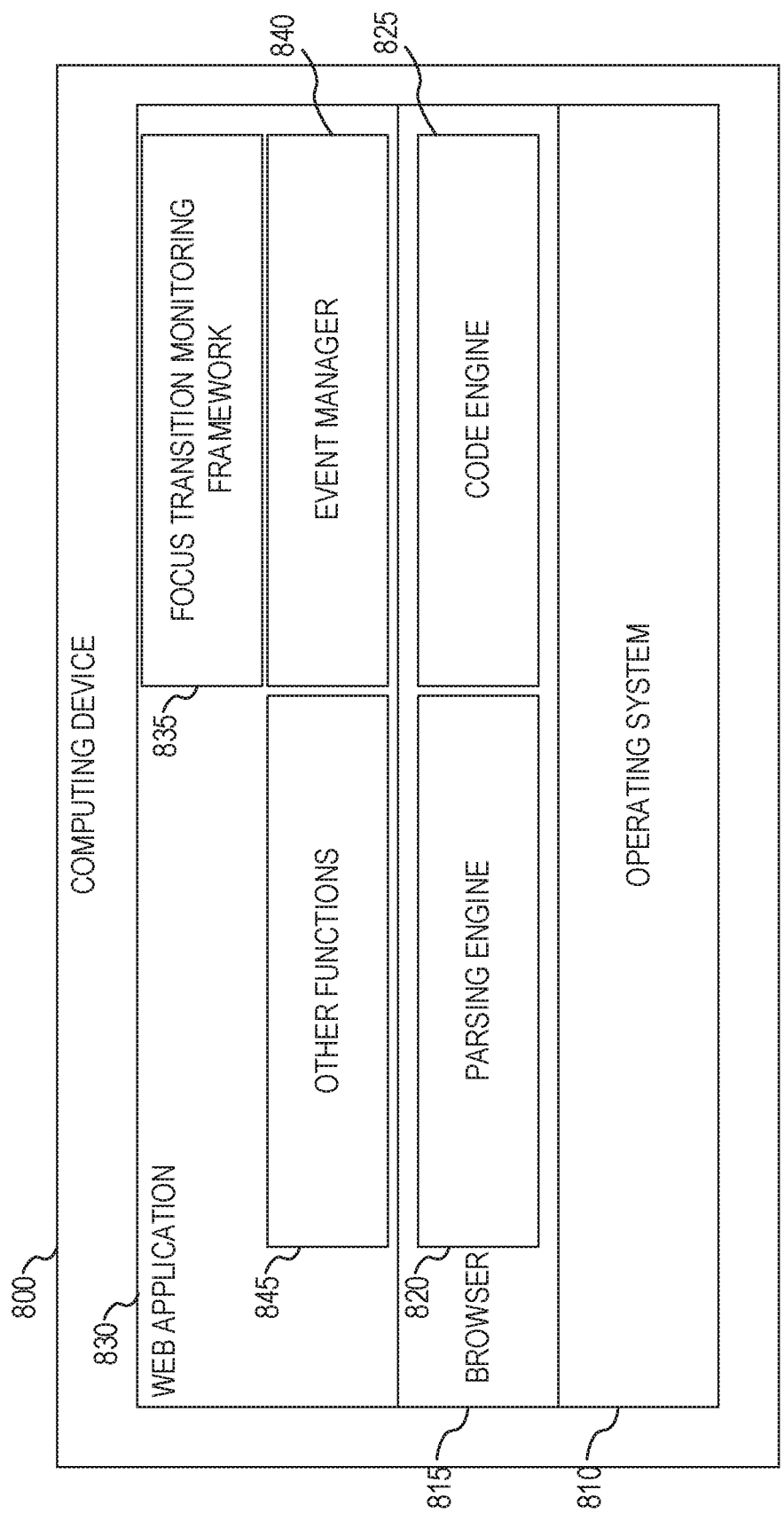
FIG. 8 shows a logical schematic of software executing on a user's computing device according to some examples of the present disclosure.

FIG. 8 shows a logical schematic of software executing on a user's computing device 800 according to some examples of the present disclosure. Operating system 810 may interface with hardware of the user's computing device 800 and may provide task scheduling (including multi-threaded support), maintenance, error handling, interprocess communication, memory allocation, Application Programming Interfaces (API) to interface with the hardware, and the like. Browser 815 may communicate over a computing network using hardware (via the operating system 810) to request browser-based application descriptors (e.g., websites) from remote servers. Browser 815 may then render the web application (including any Graphical User Interfaces) described by the browser-based application descriptors using display interfaces provided by operating system 810. As part of rendering the web application, the browser may parse the browser-based application descriptors using parsing engine 820. Parsing engine 820 may parse the browser-based application descriptors and produce a DOM. As noted the browser-based application descriptor may include executable code, such as JavaScript, Java, Perl, and other scripts. These scripts may be executed by the code engine 825 (e.g., a JavaScript engine). Web application 830, is specified by the browser-based application descriptors and may include HTML, CSS, JavaScript, other scripting languages, and the like.

Web application 830 may include the focus transition monitoring framework 835 which may serialize focus transitions and may implement custom actions based upon declarative languages, custom focus transition ordering, and the like as described herein. The focus transition monitoring framework may utilize an event manager framework 840, such as provided by a higher level programming language library (e.g., a JavaScript library) to receive events, register callbacks, and the like. Other functions 845 may provide GUI elements, interactive elements, and content to provide the other functions of the web application 830.

Figure 9:
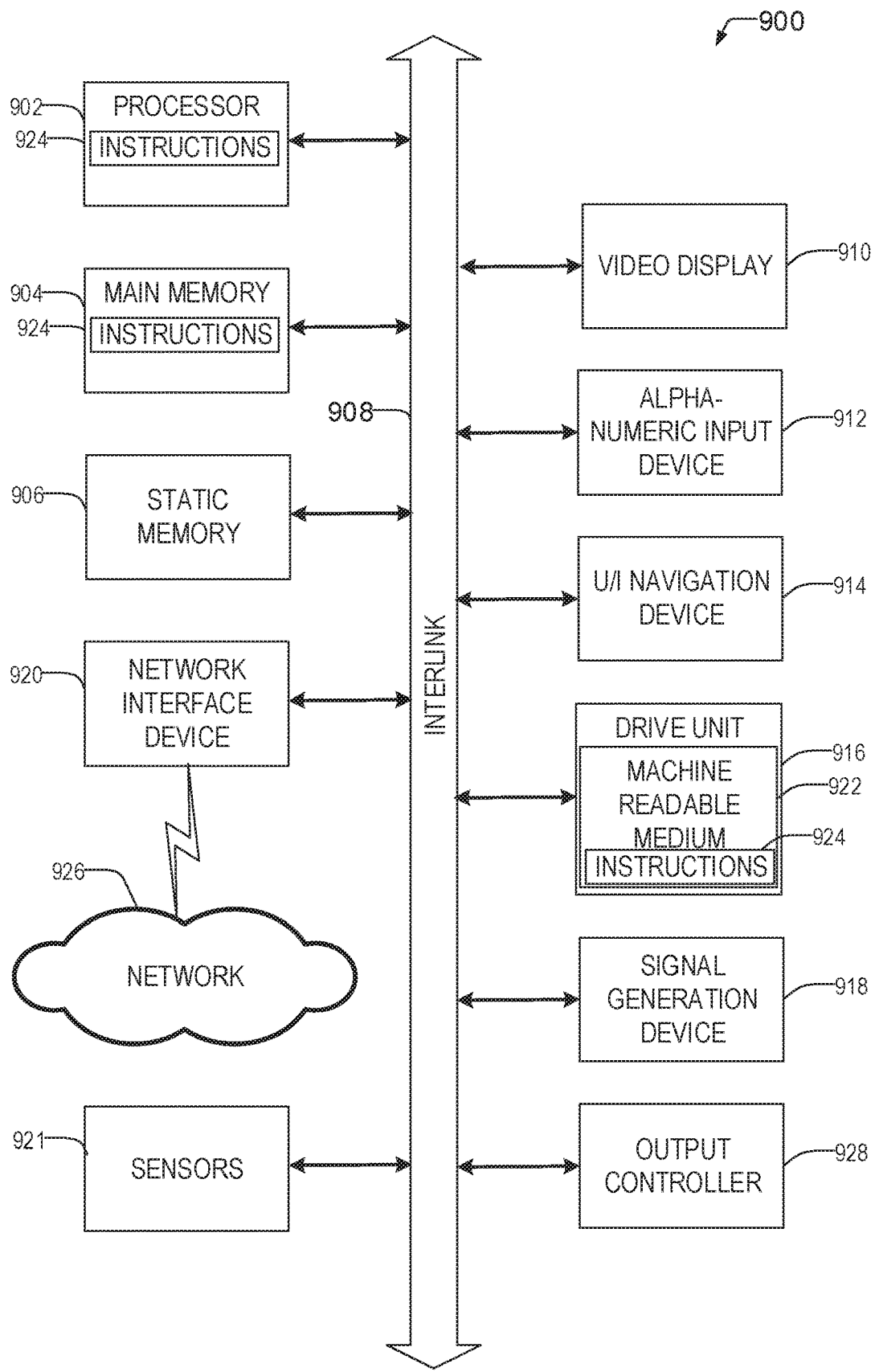
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a computing device such as a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, the machine 900 may be configured as indicated in FIG. 8, may produce any one or more of the graphs and state transitions shown in FIGS. 1-4 and be configured to perform the methods of any one or more of FIGS. 5-7. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared(IR), near field communication (NFC), etc. connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The Machine 900 may communicate with one or more other machines utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIM), multiple-input multiple-output (MEMO), or multiple-input single-output (MISO) techniques. In some examples, the network interface device 920 may wirelessly communicate using Multiple User MIMO techniques.

Other Notes And Examples

Example 1 is a computing device comprising: a processor; a memory communicatively coupled to the processor and comprising instructions, which when performed by the processor, causes the computing device to execute a focus transition monitoring framework, the framework executing operations comprising: determining a focus sub-tree of a document object model (DOM) tree, the DOM tree produced by a browser application in response to loading a browser-based application descriptor, the focus sub-tree comprising a hierarchical ordering of elements from the DOM that are capable of receiving focus; listening for focus related events of a root element of the focus sub-tree; detecting a received focus related input from a user involving an element of the focus sub-tree; and serializing the focus related input from the user to create a serialized output, the serialized output comprising a source element and a destination element, the source element specifying a first element of the DOM that had focus prior to the focus related input, the destination element specifying a second element of the DOM that has focus after the focus related input.

In Example 2, the subject matter of Example 1 optionally includes wherein the focus transition monitoring framework is a scripting language library.

In Example 3, the subject matter of any one or more of Examples 1-2 optionally include wherein the operations of serializing the focus related input from the user to create the serialized output comprises: determining that the focus related event is a focus-out event and record a time of the event and a target element of the focus-out event; and determining that a focus-in event occurred after the focus-out event, and, in response, triggering a focus transition event with a target of the focus-in event as the destination element and the target element of the focus-out event as the source element.

In Example 4, the subject matter of any one or more of Examples optionally include wherein the operations of serializing the focus related input from the user to create the serialized output comprises: determining that the focus related event is a focus-out event and record a time of the event and a target element of the focus-out event; and determining that a focus-in event did not occur within a predetermined time period of the focus-out event and in response triggering a focus transition event with the destination element as an invalid element and the source element as the target element.

In Example 5, the subject matter of any one or more of Examples 1-4 optionally include wherein the operations further comprise: determining that the focus related event is a focus-in event and record a time of the event and a target element of the focus-in event; and determining that a focus-out event did not occur and in response triggering a focus transition event with a target of the focus-in event as the destination element and an invalid element as the source element.

In Example 6, the subject matter of any one or more of Examples 1-5 optionally include wherein the operations further comprise: responsive to detecting the focus related input from the user: determining a lowest common ancestor (LCA) element in the focus sub-tree of the source element and the destination element; determining that an element on a path from the source element to the LCA element includes a declaratively defined behavior in the browser-based application descriptor for the focus related input; and responsive to determining that the element on the path from the source element to the LCA element includes the declaratively defined behavior in the browser-based application descriptor for the focus related input, executing the declaratively defined behavior.

In Example 7, the subject matter of Example 6 optionally includes wherein the operations further comprise: responsive to detecting the focus related input from the user: determining that a second element on the path from the source element to the LCA element includes a second declaratively defined behavior in the browser-based application descriptor for the focus related input; and responsive to determining that the element on the path from the source element to the LCA element includes the second declaratively defined behavior in the browser-based application descriptor for the focus related input, aggregating the declaratively defined behavior and the second declaratively defined behavior.

In Example 8, the subject matter of Example 7 optionally includes wherein the declaratively defined behavior is a user message that will be presented to the user, and wherein the operations of aggregating the declaratively defined behaviors comprises aggregating the user messages corresponding to the declaratively defined behavior and the second declaratively defined behavior into an aggregate message and wherein executing the declaratively defined behavior comprises presenting the aggregate message.

In Example 9, the subject matter of any one or more of Examples 1-8 optionally include wherein the operations of detecting a received focus related input from a user comprises detecting a focus navigation input, and wherein the operations further comprise: intercepting the browser's default focus related input handling; and determining a target element from the focus sub-tree, the target element being different than the target element that would have been selected by the browser.

Example 10 is a method for managing focus transitions in a browser, the method comprising: executing a focus transition monitoring framework, the framework executing operations comprising: determining a focus sub-tree of a document object model (DOM) tree, the DOM tree produced by the browser in response to loading a browser-based application descriptor, the focus sub-tree comprising a hierarchical ordering of elements from the DOM that are capable of receiving focus; listening for focus related events of a root element of the focus sub-tree; detecting a received focus related input from a user involving an element of the focus sub-tree; and serializing the focus related input from the user to create a serialized output, the serialized output comprising a source element and a destination element, the source element specifying a first element of the DOM that had focus prior to the focus related input, the destination element specifying a second element of the DOM that has focus after the focus related input.

In Example 11, the subject matter of Example 10 optionally includes wherein the focus transition monitoring framework is a scripting language library.

In Example 12, the subject matter of any one or more of Examples 10-11 optionally include wherein serializing the focus related input from the user to create the serialized output comprises: determining that the focus related event is a focus-out event and record a time of the event and a target element of the focus-out event; and determining that a focus-in event occurred after the focus-out event, and, in response, triggering a focus transition event with a target of the focus-in event as the destination element and the target element of the focus-out event as the source element.

In Example 13, the subject matter of any one or more of Examples 10-12 optionally include wherein serializing the focus related input from the user to create the serialized output comprises: determining that the focus related event is a focus-out event and record a time of the event and a target element of the focus-out event; and determining that a focus-in event did not occur within a predetermined time period of the focus-out event and in response triggering a focus transition event with the destination element as an invalid element and the source element as the target element.

In Example 14, the subject matter of any one or more of Examples 10-13 optionally include wherein the operations further comprise: determining that the focus related event is a focus-in event and record a time of the event and a target element of the focus-in event; and determining that a focus-out event did not occur and in response triggering a focus transition event with a target of the focus-in event as the destination element and an invalid element as the source element.

In Example 15, the subject matter of any one or more of Examples 10-14 optionally include wherein the operations further comprise: responsive to detecting the focus related input from the user: determining a lowest common ancestor (LCA) element in the focus sub-tree of the source element and the destination element; determining that an element on a path from the source element to the LCA element includes a declaratively defined behavior in the browser-based application descriptor for the focus related input; and responsive to determining that the element on the path from the source element to the LCA element includes the declaratively defined behavior in the browser-based application descriptor for the focus related input, executing the declaratively defined behavior.

In Example 16, the subject matter of Example 15 optionally includes wherein the operations further comprise: responsive to detecting the focus related input from the user: determining that a second element on the path from the source element to the LCA element includes a second declaratively defined behavior in the browser-based application descriptor for the focus related input; and responsive to determining that the element on the path from the source element to the LCA element includes the second declaratively defined behavior in the browser-based application descriptor for the focus related input, aggregating the declaratively defined behavior and the second declaratively defined behavior.

In Example 17, the subject matter of Example 16 optionally includes wherein the declaratively defined behavior is a user message that will be presented to the user, and wherein aggregating the declaratively defined behaviors comprises aggregating the user messages corresponding to the declaratively defined behavior and the second declaratively defined behavior into an aggregate message and wherein executing the declaratively defined behavior comprises presenting the aggregate message.

In Example 18, the subject matter of any one or more of Examples 10-17 optionally include wherein detecting a received focus related input from a user comprises detecting a focus navigation input, and wherein the method further comprises: intercepting the browser's default focus related input handling; and determining a target element from the focus sub-tree, the target element being different than the target element that would have been selected by the browser.

Example 19 is a machine-readable medium, comprising instructions that when executed by a machine, cause the machine to perform operations comprising: executing a focus transition monitoring framework, the framework executing operations comprising: determining a focus sub-tree of a document object model (DOM) tree, the DOM tree produced by a browser application in response to loading a browser-based application descriptor, the focus sub-tree comprising a hierarchical ordering of elements from the DOM that are capable of receiving focus; listening for focus related events of a root element of the focus sub-tree; detecting a received focus related input from a user involving an element of the focus sub-tree; and serializing the focus related input from the user to create a serialized output, the serialized output comprising a source element and a destination element, the source element specifying a first element of the DOM that had focus prior to the focus related input, the destination element specifying a second element of the DOM that has focus after the focus related input.

In Example 20, the subject matter of Example 19 optionally includes wherein the focus transition monitoring framework is a scripting language library.

In Example 21, the subject matter of any one or more of Examples 19-20 optionally include wherein the operations of serializing the focus related input from the user to create the serialized output comprises: determining that the focus related event is a focus-out event and record a time of the event and a target element of the focus-out event; and determining that a focus-in event occurred after the focus-out event, and, in response, triggering a focus transition event with a target of the focus-in event as the destination element and the target element of the focus-out event as the source element.

In Example 22, the subject matter of any one or more of Examples 19-21 optionally include wherein the operations of serializing the focus related input from the user to create the serialized output comprises: determining that the focus related event is a focus-out event and record a time of the event and a target element of the focus-out event; and determining that a focus-in event did not occur within a predetermined time period of the focus-out event and in response triggering a focus transition event with the destination element as an invalid element and the source element as the target element.

In Example 23, the subject matter of any one or more of Examples 19-22 optionally include wherein the operations further comprise: determining that the focus related event is a focus-in event and record a time of the event and a target element of the focus-in event; and determining that a focus-out event did not occur and in response triggering a focus transition event with a target of the focus-in event as the destination element and an invalid element as the source element.

In Example 24, the subject matter of any one or more of Examples 19-23 optionally include wherein the operations further comprise: responsive to detecting the focus related input from the user: determining a lowest common ancestor (LCA) element in the focus sub-tree of the source element and the destination element; determining that an element on a path from the source element to the LCA element includes a declaratively defined behavior in the browser-based application descriptor for the focus related input; and responsive to determining that the element on the path from the source element to the LCA element includes the declaratively defined behavior in the browser-based application descriptor for the focus related input, executing the declaratively defined behavior.

In Example 25, the subject matter of Example 24 optionally includes wherein the operations further comprise: responsive to detecting the focus related input from the user: determining that a second element on the path from the source element to the LCA element includes a second declaratively defined behavior in the browser-based application descriptor for the focus related input; and responsive to determining that the element on the path from the source element to the LCA element includes the second declaratively defined behavior in the browser-based application descriptor for the focus related input, aggregating the declaratively defined behavior and the second declaratively defined behavior.

In Example 26, the subject matter of Example 25 optionally includes wherein the declaratively defined behavior is a user message that will be presented to the user, and wherein the operations of aggregating the declaratively defined behaviors comprises aggregating the user messages corresponding to the declaratively defined behavior and the second declaratively defined behavior into an aggregate message and wherein executing the declaratively defined behavior comprises presenting the aggregate message.

In Example 27, the subject matter of any one or more of Examples 19-26 optionally include wherein the operations of detecting a received focus related input from a user comprises detecting a focus navigation input, and wherein the operations further comprise: intercepting the browser's default focus related input handling; and determining a target element from the focus sub-tree, the target element being different than the target element that would have been selected by the browser.

Example 28 is a device comprising: means for executing a focus transition monitoring framework, the framework executing operations comprising: means for determining a focus sub-tree of a document object model (DOM) tree, the DOM tree produced by a browser application in response to loading a browser-based application descriptor, the focus sub-tree comprising a hierarchical ordering of elements from the DOM that are capable of receiving focus; means for listening for focus related events of a root element of the focus sub-tree; means for detecting a received focus related input from a user involving an element of the focus sub-tree; and means for serializing the focus related input from the user to create a serialized output, the serialized output comprising a source element and a destination element, the source element specifying a first element of the DOM that had focus prior to the focus related input, the destination element specifying a second element of the DOM that has focus after the focus related input.

In Example 29, the subject matter of Example 28 optionally includes wherein the focus transition monitoring framework is a scripting language library.

In Example 30, the subject matter of any one or more of Examples 28-29 optionally include wherein the operations of serializing the focus related input from the user to create the serialized output comprises: means for determining that the focus related event is a focus-out event and record a time of the event and a target element of the focus-out event; and means for determining that a focus-in event occurred after the focus-out event, and, in response, triggering a focus transition event with a target of the focus-in event as the destination element and the target element of the focus-out event as the source element.

In Example 31, the subject matter of any one or more of Examples 28-30 optionally include wherein the operations of serializing the focus related input from the user to create the serialized output comprises: means for determining that the focus related event is a focus-out event and record a time of the event and a target element of the focus-out event; and means for determining that a focus-in event did not occur within a predetermined time period of the focus-out event and in response triggering a focus transition event with the destination element as an invalid element and the source element as the target element.

In Example 32, the subject matter of any one or more of Examples 28-31 optionally include wherein the operations further comprise: means for determining that the focus related event is a focus-in event and record a time of the event and a target element of the focus-in event; and means for determining that a focus-out event did not occur and in response triggering a focus transition event with a target of the focus-in event as the destination element and an invalid element as the source element.

In Example 33, the subject matter of any one or more of Examples 28-32 optionally include wherein the operations further comprise: responsive to detecting the focus related input from the user: means for determining a lowest common ancestor (LCA) element in the focus sub-tree of the source element and the destination element; means for determining that an element on a path from the source element to the LCA element includes a declaratively defined behavior in the browser-based application descriptor for the focus related input; and means for responsive to determining that the element on the path from the source element to the LCA element includes the declaratively defined behavior in the browser-based application descriptor for the focus related input, executing the declaratively defined behavior.

In Example 34, the subject matter of Example 33 optionally includes wherein the operations further comprise: means for responsive to detecting the focus related input from the user: means for determining that a second element on the path from the source element to the LCA element includes a second declaratively defined behavior in the browser-based application descriptor for the focus related input; and means for responsive to determining that the element on the path from the source element to the LCA element includes the second declaratively defined behavior in the browser-based application descriptor for the focus related input, aggregating the declaratively defined behavior and the second declaratively defined behavior.

In Example 35, the subject matter of Example 34 optionally includes wherein the declaratively defined behavior is a user message that will be presented to the user, and wherein the operations of aggregating the declaratively defined behaviors comprises means for aggregating the user messages corresponding to the declaratively defined behavior and the second declaratively defined behavior into an aggregate message and wherein executing the declaratively defined behavior comprises means for presenting the aggregate message.

In Example 36, the subject matter of any one or more of Examples 28-35 optionally include wherein the operations of detecting a received focus related input from a user comprises means for detecting a focus navigation input, and wherein the operations further comprise: means for intercepting the browser's default focus related input handling; and means for determining a target element from the focus sub-tree, the target element being different than the target element that would have been selected by the browser.

What is claimed is:

1. A computing device comprising:
   a processor;
   a memory communicatively coupled to the processor and comprising instructions, which when performed by the processor, causes the computing device to execute a focus transition monitoring framework, the framework executing operations comprising:
      creating a focus sub-tree of a document object model (DOM) tree, the DOM tree produced by a browser application in response to loading a browser-based application descriptor, the focus sub-tree a hierarchical ordering of elements from the DOM that are capable of receiving focus, each of the elements from the DOM that are capable of receiving focus having a corresponding level in the focus sub-tree corresponding to a distance, in focusable elements, from a root level of the DOM;
      listening for focus related events of a root element of the focus sub-tree;
      detecting a received focus related input from a user involving an element of the focus sub-tree; and
      serializing the focus related input from the user to create a serialized output, the serialized output comprising a description of a source element and a destination element, the source element description specifying a first element of the DOM that had focus prior to the focus related input, the destination element description specifying a second element of the DOM that has focus after the focus related input.

2. The device of claim 1, wherein the focus transition monitoring framework is a scripting language library.

3. The device of claim 1, wherein the operations of serializing the focus related input from the user to create the serialized output comprises:
   determining that the focus related event is a focus-out event and record a time of the event and a target element of the focus-out event; and
   determining that a focus-in event occurred after the focus-out event, and, in response, triggering a focus transition event with a target of the focus-in event as the destination element and the target element of the focus-out event as the source element.

4. The device of claim 1, wherein the operations of serializing the focus related input from the user to create the serialized output comprises:

determining that the focus related event is a focus-out event and record a time of the event and a target element of the focus-out event; and determining that a focus-in event did not occur within a predetermined time period of the focus-out event and in response triggering a focus transition event with the destination element as an invalid element and the source element as the target element.

5. The device of claim 1, wherein the operations further comprise:

determining that the focus related event is a focus-in event and record a time of the event and a target element of the focus-in event; and determining that a focus-out event did not occur and in response triggering a focus transition event with a target of the focus-in event as the destination element and an invalid element as the source element.

6. The device of claim 1, wherein the operations further comprise:

responsive to detecting the focus related input from the user:

determining a lowest common ancestor (LCA) element in the focus sub-tree of the source element and the destination element;

determining that an element on a path from the source element to the LCA element includes a declaratively defined behavior in the browser-based application descriptor for the focus related input; and responsive to determining that the element on the path from the source element to the LCA element includes the declaratively defined behavior in the browser-based application descriptor for the focus related input, executing the declaratively defined behavior.

7. The device of claim 6, wherein the operations further comprise:

responsive to detecting the focus related input from the user:

determining that a second element on the path from the source element to the LCA element includes a second declaratively defined behavior in the browser-based application descriptor for the focus related input; and responsive to determining that the element on the path from the source element to the LCA element includes the second declaratively defined behavior in the browser-based application descriptor for the focus related input, aggregating the declaratively defined behavior and the second declaratively defined behavior.

8. The device of claim 7, wherein the declaratively defined behavior is a user message that will be presented to the user, and wherein the operations of aggregating the declaratively defined behaviors comprises aggregating the user messages corresponding to the declaratively defined behavior and the second declaratively defined behavior into an aggregate message and wherein executing the declaratively defined behavior comprises presenting the aggregate message.

9. The device of claim 1, wherein the operations of detecting a received focus related input from a user comprises detecting a focus navigation input, and wherein the operations further comprise:

intercepting the browser's default focus related input handling; and determining a target element from the focus sub-tree, the target element being different than the target element that would have been selected by the browser.

10. A method for managing focus transitions in a browser, the method comprising:

executing a focus transition monitoring framework, the framework executing operations comprising:

creating a focus sub-tree of a document object model (DOM) tree, the DOM tree produced by the browser in response to loading a browser-based application descriptor, the focus sub-tree a hierarchical ordering of elements from the DOM that are capable of receiving focus, each of the elements from the DOM that are capable of receiving focus having a corresponding level in the focus sub-tree corresponding to a distance, in focusable elements, from a root level of the DOM;

listening for focus related events of a root element of the focus sub-tree;

detecting a received focus related input from a user involving an element of the focus sub-tree; and serializing the focus related input from the user to create a serialized output, the serialized output comprising a description of a source element and a destination element, the source element description specifying a first element of the DOM that had focus prior to the focus related input, the destination element description specifying a second element of the DOM that has focus after the focus related input.

11. The method of claim 10, wherein the focus transition monitoring framework is a scripting language library.

12. The method of claim 10, wherein serializing the focus related input from the user to create the serialized output comprises:

determining that the focus related event is a focus-out event and record a time of the event and a target element of the focus-out event; and determining that a focus-in event occurred after the focus-out event, and, in response, triggering a focus transition event with a target of the focus-in event as the destination element and the target element of the focus-out event as the source element.

13. The method of claim 10, wherein serializing the focus related input from the user to create the serialized output comprises:

determining that the focus related event is a focus-out event and record a time of the event and a target element of the focus-out event; and determining that a focus-in event did not occur within a predetermined time period of the focus-out event and in response triggering a focus transition event with the destination element as an invalid element and the source element as the target element.

14. The method of claim 10, wherein the operations further comprise:

determining that the focus related event is a focus-in event and record a time of the event and a target element of the focus-in event; and determining that a focus-out event did not occur and in response triggering a focus transition event with a target of the focus-in event as the destination element and an invalid element as the source element.

15. A machine-readable medium, comprising instructions that when executed by a machine, cause the machine to perform operations comprising:

executing a focus transition monitoring framework, the framework executing operations comprising:

creating a focus sub-tree of a document object model (DOM) tree, the DOM tree produced by a browser application in response to loading a browser-based application descriptor, the focus sub-tree a hierarchical ordering of elements from the DOM that are capable of receiving focus, each of the elements from the DOM that are capable of receiving focus having a corresponding level in the focus sub-tree corresponding to a distance in focusable elements, from a root level of the DOM;

listening for focus related events of a root element of the focus sub-tree;

detecting a received focus related input from a user involving an element of the focus sub-tree; and serializing the focus related input from the user to create a serialized output, the serialized output comprising a description of a source element and a destination element, the source element description specifying a first element of the DOM that had focus prior to the focus related input, the destination element description specifying a second element of the DOM that has focus after the focus related input.

16. The machine-readable medium of claim 15, wherein the focus transition monitoring framework is a scripting language library.

17. The machine-readable medium of claim 15, wherein the operations of serializing the focus related input from the user to create the serialized output comprises:

determining that the focus related event is a focus-out event and record a time of the event and a target element of the focus-out event; and determining that a focus-in event occurred after the focus-out event, and, in response, triggering a focus transition event with a target of the focus-in event as the destination element and the target element of the focus-out event as the source element.

18. The machine-readable medium of claim 15, wherein the operations of serializing the focus related input from the user to create the serialized output comprises:

determining that the focus related event is a focus-out event and record a time of the event and a target element of the focus-out event; and determining that a focus-in event did not occur within a predetermined time period of the focus-out event and in response triggering a focus transition event with the destination element as an invalid element and the source element as the target element.

19. The machine-readable medium of claim 15, wherein the operations further comprise:

determining that the focus related event is a focus-in event and record a time of the event and a target element of the focus-in event; and determining that a focus-out event did not occur and in response triggering a focus transition event with a target of the focus-in event as the destination element and an invalid element as the source element.

20. The machine-readable medium of claim 15, wherein the operations further comprise:

responsive to detecting the focus related input from the user:

determining a lowest common ancestor (LCA) element in the focus sub-tree of the source element and the destination element;

determining that an element on a path from the source element to the LCA element includes a declaratively defined behavior in the browser-based application descriptor for the focus related input; and responsive to determining that the element on the path from the source element to the LCA element includes the declaratively defined behavior in the browser-based application descriptor for the focus related input, executing the declaratively defined behavior.

* * * * *